United States Patent [19]

Park

[11] Patent Number: 5,241,582

[45] Date of Patent: Aug. 31, 1993

[54] CONTROL FOR SUPPLYING POWER TO CAR AUDIO AND PHONE SYSTEMS

[75] Inventor: Chan Hyun Park, Seoul, Rep. of Korea

[73] Assignee: Hyundai Electronics Industries Co., Ltd., Kyoungkido, Rep. of Korea

[21] Appl. No.: 614,450

[22] Filed: Nov. 16, 1990

[30] Foreign Application Priority Data

Nov. 30, 1989 [KR] Rep. of Korea ............... 1989-17695
Nov. 30, 1989 [KR] Rep. of Korea ............... 1989/17701

[51] Int. Cl.$^5$ ............................................. H04M 11/00
[52] U.S. Cl. ........................................ 379/58; 379/63; 379/441; 455/88
[58] Field of Search ....................... 379/58, 59, 61, 63, 379/441; 455/38.3, 88, 127, 343

[56] References Cited

U.S. PATENT DOCUMENTS

| | | | |
|---|---|---|---|
| 3,971,985 | 7/1976 | Arai | 455/88 |
| 4,591,661 | 5/1986 | Benedetto et al. | 379/61 |
| 4,873,712 | 10/1989 | Porco | 379/58 |
| 4,993,061 | 2/1991 | Hsieh | 379/58 |

*Primary Examiner*—Curtis Kuntz
*Assistant Examiner*—Dwayne D. Bost
*Attorney, Agent, or Firm*—Darby & Darby

[57] ABSTRACT

A delay and inverting circuit, connected to the car phone system, is for delaying a status of operation of the car phone system and inverting a signal having a predetermined signal level according to the operation of the car phone system. A switching circuit, connected to the delay and inverting circuit, is for effecting a switching operation in accordance with a signal generated from the delay and inverting circuit. An amplifier, connected to the switching circuit and the car audio system, is for amplifying an output signal generated from the switching circuit and generating a driving signal to the car audio system.

1 Claim, 6 Drawing Sheets

CONTROL FOR SUPPLYING POWER TO CAR AUDIO AND PHONE SYSTEMS

BACKGROUND OF THE INVENTION

The present invention relates to a power supplying control circuit, and more particularly, to an improved power supplying control circuit in two systems which require a selective operation and own the same power supply jointly in order to detect an operation of one system and to automatically cut off the supply of power to the other system.

Generally, in most cases that two systems own one power supply jointly, means for controlling each drive of each system within their respective systems are included. That is, each system is separately driven. Such a system which requires a selection operation of each system, however, has several problems. For example, while one of the systems is operating, it is necessary to stop an operation of the other system. For example, a car audio system is usually included in the vehicle and a car phone system is also mounted. In this case, two systems own one power supply, for example, a battery jointly. If while the car audio system is operating a driver uses the car phone system, a sound output from the car audio system is a serious obstacle to use of the car phone. Thus, since he had to make an necessary operation to turn down the output of the car audio system or to out off the supply of power to the car audio system to use the car phone, a power of concentration on driving was decreased and thus, there was quite a possibility that an accident might happen.

FIG. 1 is a power supplying apparatus of the prior art including a car phone system 10 and a car audio system 20. In FIG. 1, two systems are connected to a power supply 30, i.e., a battery jointly and are operated independently. If while the car audio system 20 is operating a driver uses the car phone system, a sound output from the car audio system 20 is a serious obstacle to use of the car phone as shown above.

SUMMARY OF THE INVENTION

Accordingly, it is an object of the present invention to provide an improved power supplying control circuit for use in a vehicle which can simply detect an operation of a car phone system by owning the circuit within the car phone system jointly and automatically control a supply of power to a car audio system.

It is another object of the present invention to provide a power supplying control circuit which, in two systems in which a selective operation is required, can control automatically the supply of power to any one system.

To obtain the above object, the present invention is made up of delay and inverting means connected to the car phone system, for delaying a status of operation of the car phone system and inverting a signal having a predetermined signal level according to the operation of the car phone system, switching means connected to the delay and inverting means for effecting a switching operation in accordance with a signal generated from the delay and inverting means, and an amplifier connected to the switching means and the car audio system, for amplifying an output signal generated from the switching means and generating a driving signal to the car audio system.

According to another aspect of the present invention, it is made up of a first amplifier connected to both terminals of a resisting component, for amplifying a voltage generated through the resisting component and generating an amplified voltage; a level slicer connected to the first amplifier, for comparing the amplified voltage with a predetermined reference voltage and amplifying difference between both voltages; delay and inverting means connected to the level slicer, for delaying a output status of the level slicer and inverting a signal having a predetermined signal level according to the output status of the level slicer; switching means connected to the delay and inverting means for effecting a switching operation in accordance with the signal generated from the delay and inverting means; and a second amplifier connected to the switching means, for amplifying an output signal generated from the switching means and generating a driving signal to the car audio system.

BRIEF DESCRIPTION OF THE DRAWINGS

The objects and features of the present invention will become more apparent from a consideration of the following detailed description in conjunction with the accompanying drawings in which.

DETAILED DESCRIPTION OF THE PREFERRED EMBODIMENT

The present invention will now be described in detail as an embodiment with reference to the drawings.

Figure 1:
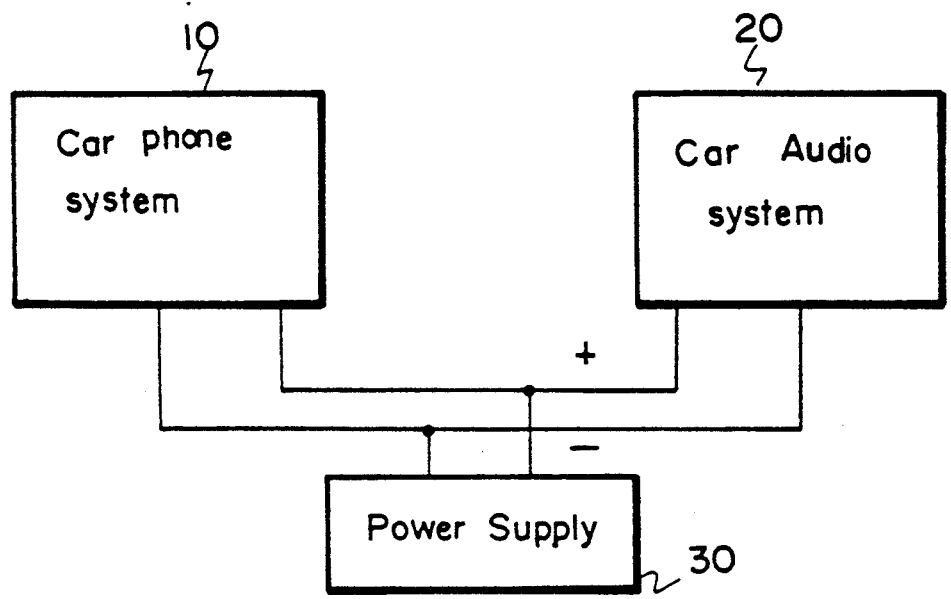
FIG. 1 is a schematic block diagram showing a power supplying apparatus of the prior art.
Figure 2:
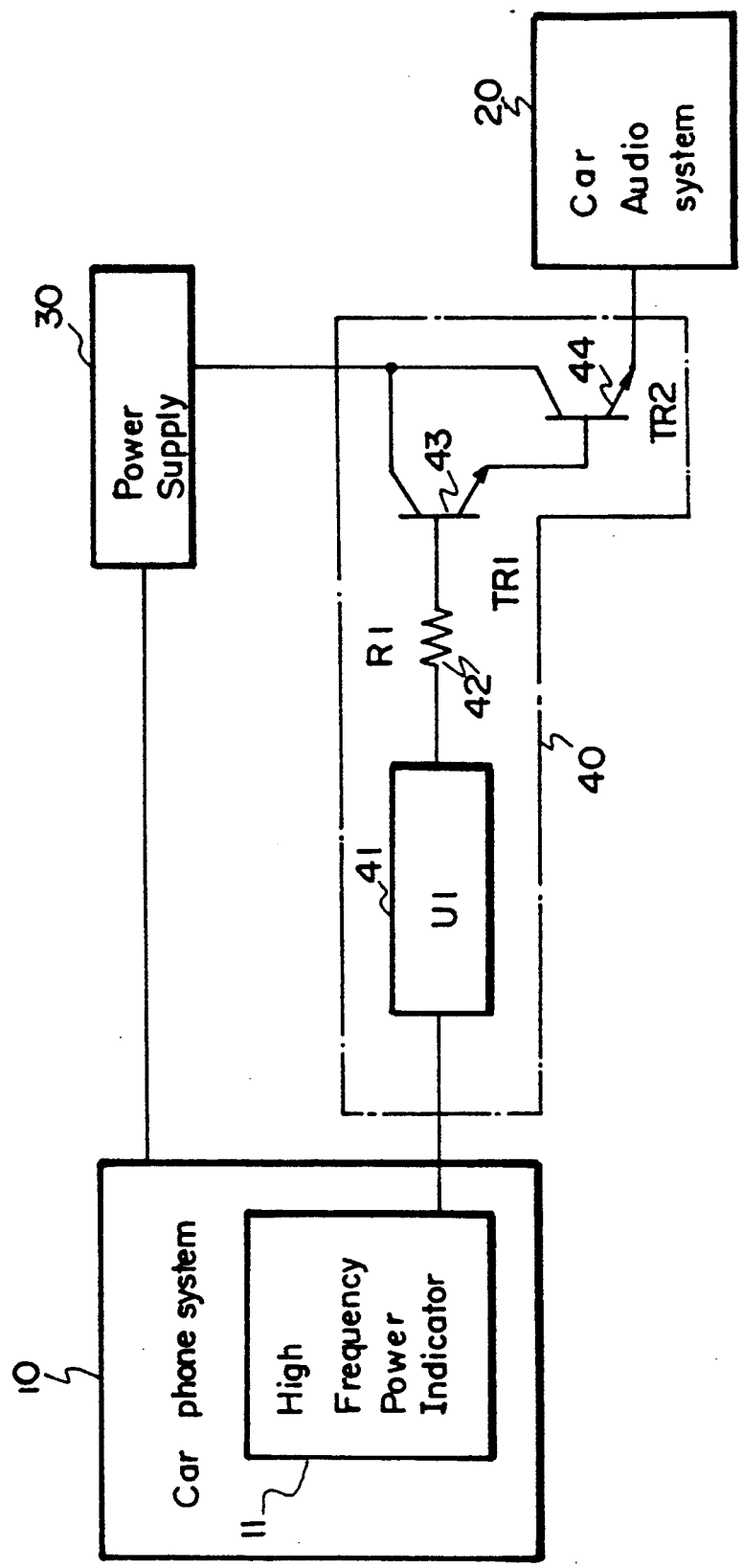
FIG. 2 is a diagram of a power supplying circuit in accordance with a first preferred embodiment of the present invention.

FIG. 2 is a diagram of a circuit showing a power supplying control circuit between two systems in accordance with a first preferred embodiment of the present invention. In FIG. 2, car phone system 10 includes a high frequency power indicator 11 indicating an amount of the high frequency power sensed in operation, and a power supplying control circuit 40 includes a delay and inverting circuit 41 for receiving signal from the above high frequency power indicator 11 and outputting a status signal of operation and a switching element for receiving the status signal and driving an amplifier 44 supplying a power to a car audio system 20. The switching element is made up of a resistor 42 and a transistor 43. In FIG. 2, 30 indicates a power supply.

Figure 3:
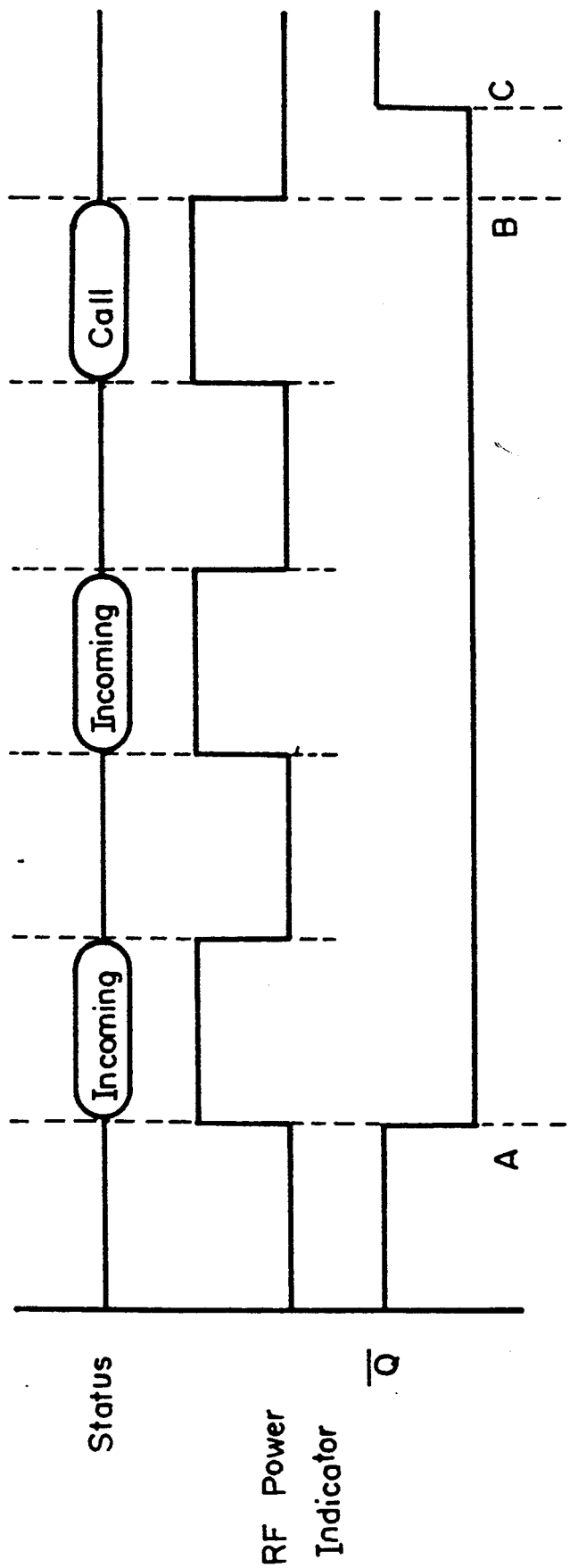
FIG. 3 is a timing diagram for explaining the power supplying control circuit of the present invention as shown in FIG. 2.

Referring to FIG. 3, first, the car phone system 10 receives incoming signals at a point (A), and the high frequency indicator 11 of the car phone system 10 indicates a power proportioning to the incoming signals. These signals are output continuously in a pulse-like form as shown in FIG. 3 during the incoming status and the telephone call status, i.e., the operation of the car phone system, and the delay and inverting circuit 41, which receives the signals, outputs a signal having a predetermined signal level, for example, a low level "L" except that the signals are input over a predetermined time period, for example, one second after a point (B) of FIG. 3.

This signal is applied to a control stage of the switching element. Thus, the switching element is turned off to cut off the supply of power to the car audio system 20.

If the operation of the car phone system 10 is terminated as the point (B) of FIG. 3, the output of signal from the high frequency indicator 11 is terminated, but a level of the signal which is output from the delay and inverting circuit 41 is inverted after the predetermined time period (1 second).

For this reason, the switching element is turned on so that a signal of the power supply is amplified by the amplifier 44 and is supplied to the car audio system 20.

Thus, in the power supplying control circuit of the present invention, if one system is operated, the supply of power to the other system is automatically cut off.

Therefore, since the power supplying control circuit of the present invention detects conveniently the status of operation from the circuit within the subject system to be detected, and there are great effects that the power supplying switch circuit can be very simply constructed and the supply of power to the other system can be automatically controlled.

Figure 4:
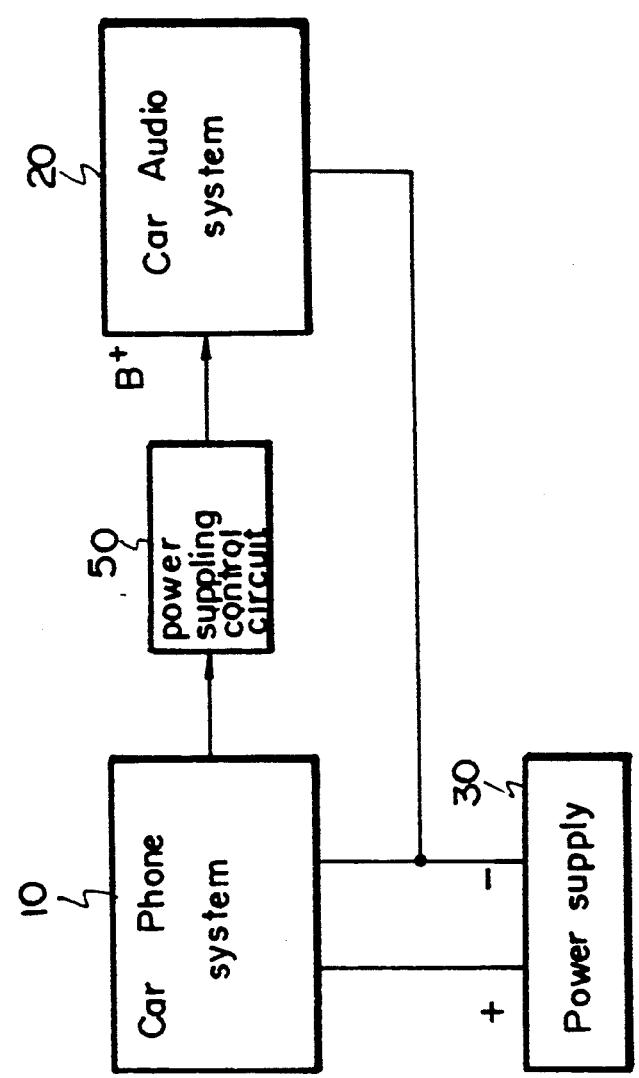
FIG. 4 is a schematic block diagram for explaining a power supplying control circuit in accordance with a second preferred embodiment of the present invention.

FIG. 4 is a schematic block diagram showing a power supplying control circuit between two systems in accordance with a second preferred embodiment of the present invention. The power supplying control circuit is connected between a car phone system 10 and a car audio system 20 which share a power supply 30 jointly, and includes a power supplying control circuit 50 for delaying a status of operation from the car phone system 10, cutting off the supply of power to the car audio system 20 when the car phone system 10 is operating, and supplying a power to the car audio system 20 when the car phone system 10 is not operating.

Figure 5:
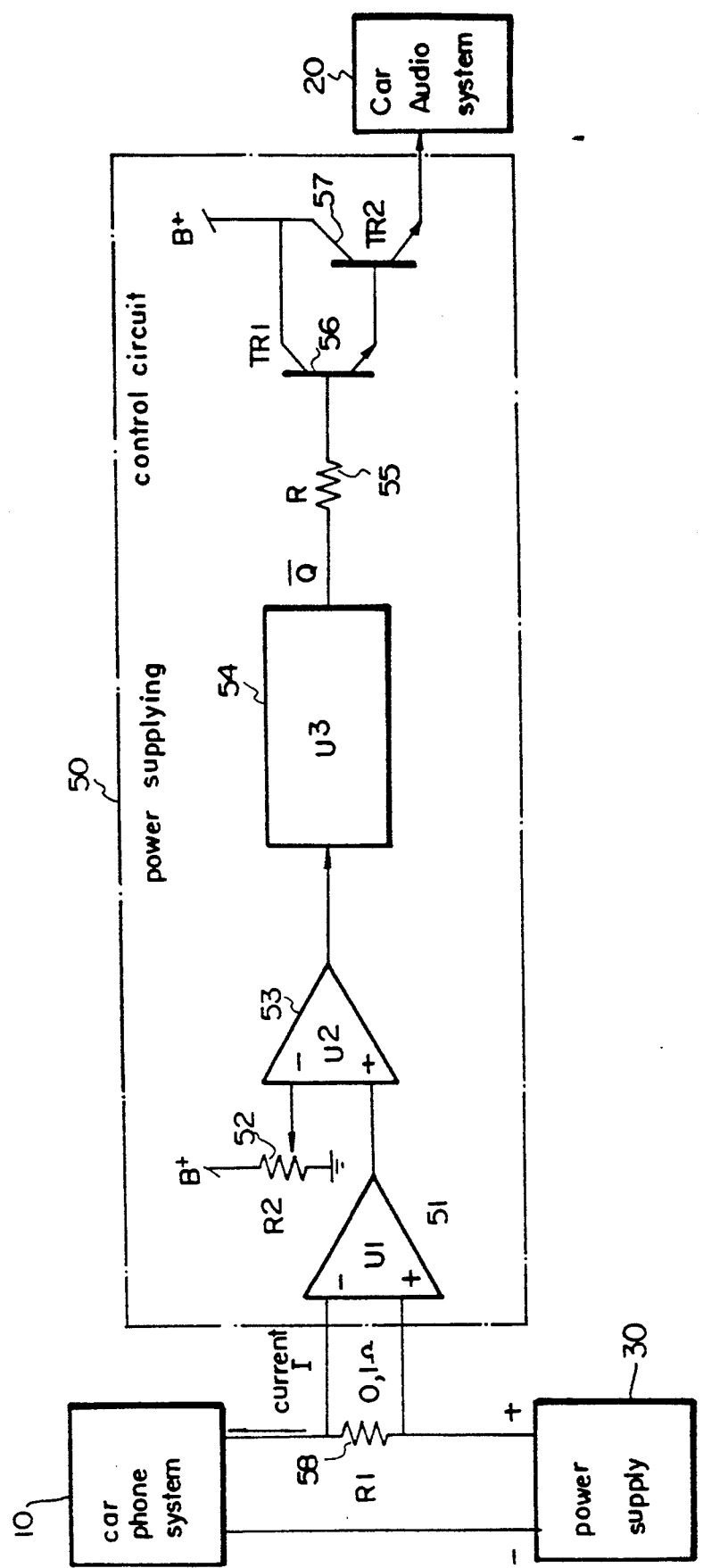
FIG. 5 is a detailed diagram of the circuit showing the power supplying control circuit of the present invention as shown in FIG. 4.

The power supplying control circuit of the present invention as shown in FIG. 4 will now be described in detail with reference to a detailed circuit of the power supplying control circuit 50 of FIG. 5 and a timing diagram of FIG. 6. The power supplying control circuit 50 includes an amplifier 51 for receiving a voltage of a resistor 58 connected between one input terminal of the system 20 and a positive terminal of the power supply 30, i.e., a battery and amplifying the voltage of the resistor 58, a level slicer 53 for receiving the signal from the amplifier 51, comparing it with reference voltage defined by a volume resistor 52 connected to a power supply 30 and outputting a proper level signal, a delay and inverting circuit 54 for receiving the signal from the level slicer 53 and maintaining the signal for a predetermined time period, for example, one second after the input of the signal is terminated, a switching element for receiving the output of the status detecting means 54 and performing a switching function, and an amplifier 57 for effecting the power supplied to the car audio system according to the operation of the switching element. In FIG. 5., the switching element is made up of a resistor 55 and a transistor 56.

First, since, in case the car phone system 10, is in a standby state, an electric current flowing through the resistor 58 becomes very small and a resistance value of the resistor 58 is very low. Accordingly the output of the amplifier 51 becomes small, and by this signal, the output of the level slicer 52 becomes "0" state. This signal is inverted through the delay inverting circuit 54, thereby to allow the switching element to be driven. Now the power is normally supplied through the amplifier 57 to the car audio system 20.

Figure 6:
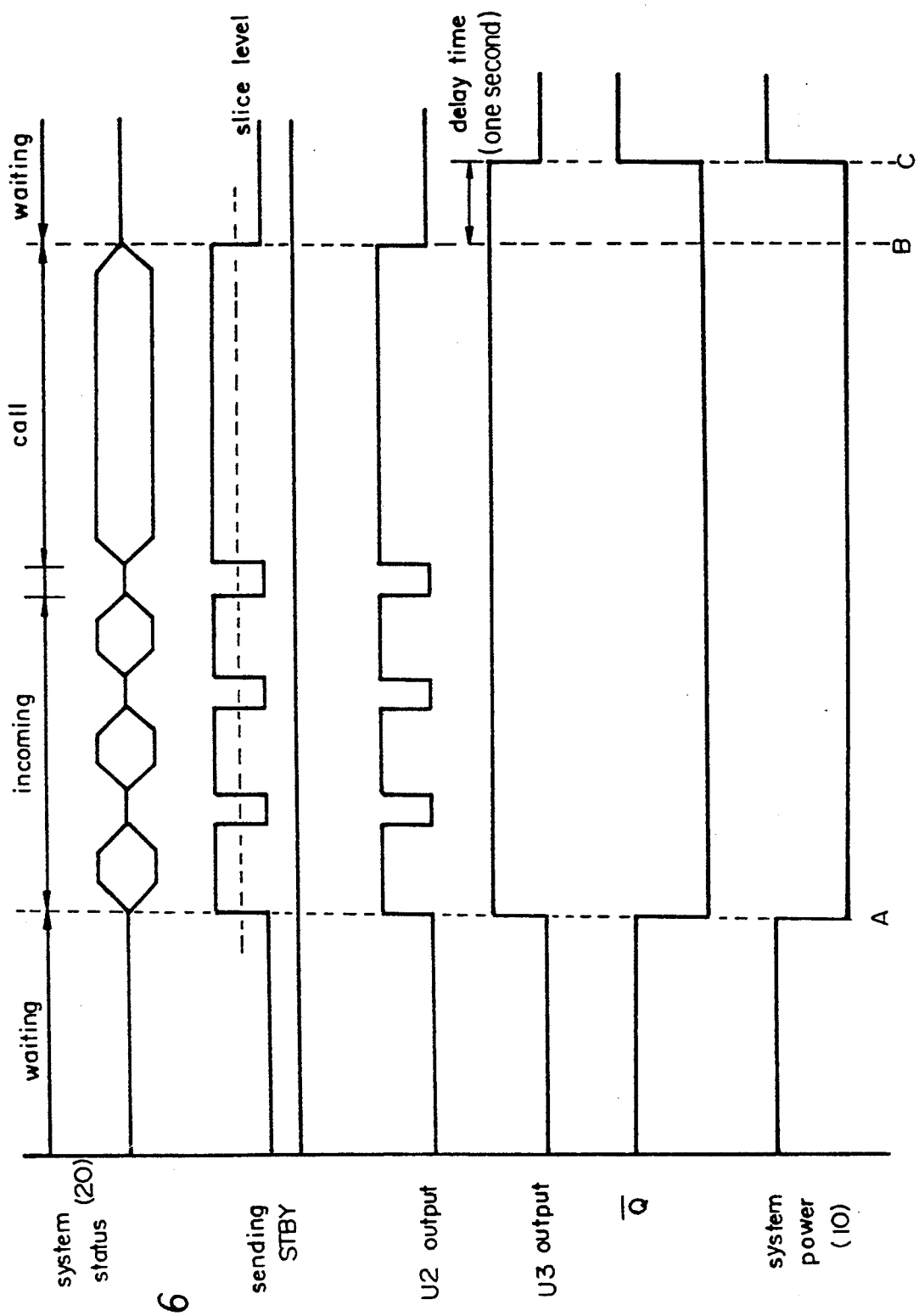
FIG. 6 is a timing diagram for explaining the power supplying control circuit of the second preferred embodiment of the present invention as shown in FIG. 4.

As shown in a point (A) of the FIG. 6., if the car phone system 10 is driven by the incoming signal, etc., the electric current flowing through the resistor 58 is rapidly increased. Accordingly, the voltage across the resistor 58 is largely increased, and due to the thus increased voltage, the output of the amplifier 51 is also increased. Since the output signal of the amplifier 51 is increased, the level slicer 53 outputs the proper level signal. This signal is supplied to the delay and inverting circuit 54, and is maintained during a predetermined time period, for example, 1 second from a final point (B) of the signal to a point (C) as shown in FIG. 6. Then the inverted signal is made to turn off the switching element, thereby to cut off the supply of power to the car audio system 20, in the point (C). Therefore, it is immediately obvious to those ordinary skilled in the art that the power supplying control circuit of the present invention automatically cuts off the supply of power to the car audio system 20 while the car phone system 10 is driven. That is, the present power supplying apparatus need not effect an unnecessary operation for turning-down the volume of the car audio system or turning off the switch during the incoming or the telephone call of the car phone system on driving and is very effective for the prevention of accidents due to the above unnecessary operation.

What is claimed is:

1. In a power supplying apparatus for use in a vehicle which has a car audio system and a car phone system with means for transmitting a signal indicative of an amount of power sensed in the operation of the car phone system, a power supplying control circuit, comprising:

means for supplying power to the car audio system;

emitting means responsive to the transmission of the signal and a termination of the transmission thereof for emitting an operation status signal indicative of a respective one of transmission and termination states of the car phone system, the emitting means including a delay and inverting circuit being responsive to the transmission state for emitting the operation status signal with a first signal level and being responsive to the termination state for emitting, after a time delay, the operation status signal with a second signal level that is an inversion of the first signal level; and switch means responsive to the operation status signal being of the first signal level and thereby indicative of the transmission state for cutting off the supplying means from supplying power to the car audio system and being responsive to the operation status signal being of the second signal level and thereby indicative of the termination state for driving the supplying means to supply power to the car audio system.

* * * * *